B. F. MERRITT.
SPEED CONTROL GOVERNOR.
APPLICATION FILED OCT. 1, 1917.
1,306,072.
Patented June 10, 1919.
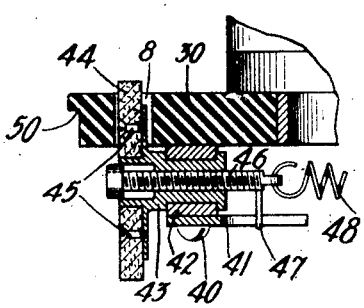
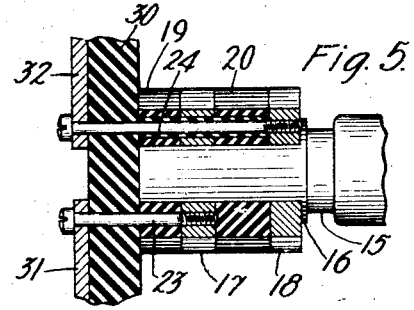
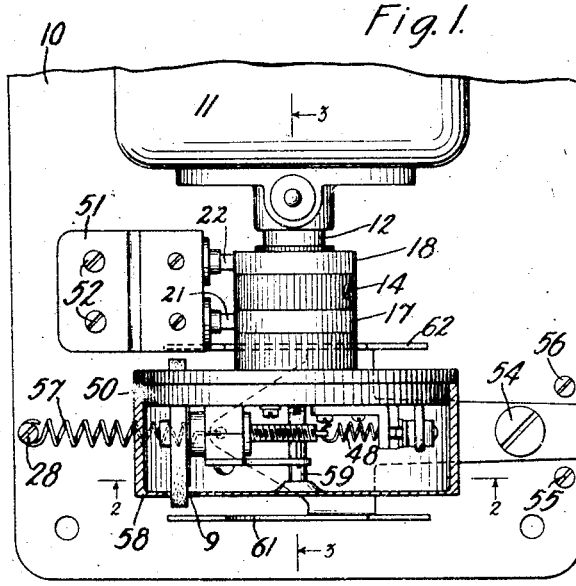
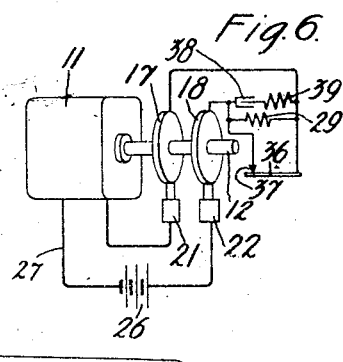
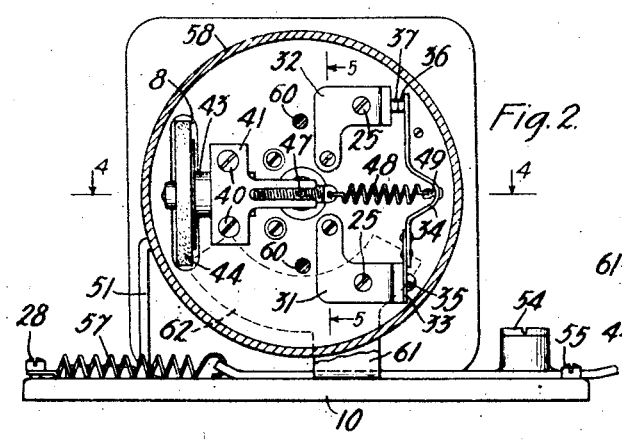
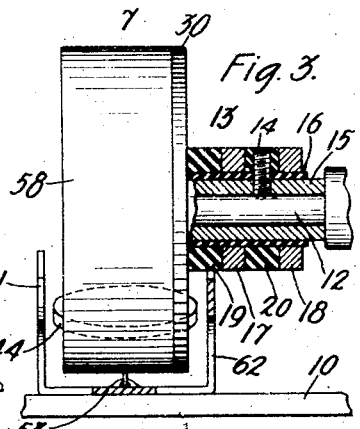
Inventor:
Benjamin F. Merritt.
by J. E. Roberts Att'y.

UNITED STATES PATENT OFFICE.

BENJAMIN F. MERRITT, OF EAST ORANGE, NEW JERSEY, ASSIGNOR TO WESTERN ELECTRIC COMPANY, INCORPORATED, OF NEW YORK, N. Y., A CORPORATION OF NEW YORK.

SPEED-CONTROL GOVERNOR.

1,306,072.  Specification of Letters Patent.  Patented June 10, 1919.

Application filed October 1, 1917. Serial No. 194,146.

*To all whom it may concern:*

Be it known that I, BENJAMIN F. MERRITT, a citizen of the United States, residing at East Orange, in the county of Essex and State of New Jersey, have invented certain new and useful Improvements in Speed-Control Governors, of which the following is a full, clear, concise, and exact description.

This invention relates to speed control governors and more particularly to centrifugal governors for automatically controlling the speed of electroresponsive driving motors or mechanisms.

The principal object of this invention is to provide a governor of simple, efficient and compact form for automatically regulating the speed of a driving means in order to maintain a substantially constant speed of the moving parts thereof.

A feature of this invention is the provision of adjustable means for rendering the governor effective to control and maintain different predetermined speeds of a motor.

A further feature of this invention is the provision of means for changing the adjustment of the governor while the motor is in operation.

This invention is illustrated in the accompanying drawing, in which Figure 1 is a top view of the governor operatively included with an electric motor, a portion of an outer casing of the governor being omitted in order to clearly show the various parts assembled therein; Fig. 2 is an end view of the governor, an end plate portion of the casing being omitted in order to show various parts therein; Fig. 3 is a side view of the governor portions thereof being shown in perspective while other portions are shown in section; Fig. 4 is an enlarged top sectional view of an arrangement for varying adjustments to control the speed range limits of the governor; Fig. 5 is a side sectional view of a collector ring assembly employed in establishing circuit connections with the governor; this assembly also serves as a nave or supporting hub for portions of the governor equipment; and Fig. 6 shows circuit arrangement of the equipment.

In describing this invention like characters of reference will be employed in so far as they apply to designate corresponding parts in the various views of the drawing.

The reference character 10 indicates a base plate to which is fixed a motor 11 (an end portion only of the motor being shown) the shaft thereof being positioned on the line 3—3. An outstanding end 12 of the motor shaft extends into an axially alined bore through a hub-like assembly 13 which is held to the shaft 12 by means of a set screw 14 (Fig. 3). The assembly 13 is formed of an inner metal sleeve 15 over which is fitted a sleeve 16 of insulating material forming a core to carry two collector rings 17 and 18 held spaced by two annularly formed sections of insulating material 19 and 20.

A disk-like assembly plate 30 preferably formed from insulating material is clamped to the assembly 13 by means of a screw 23 threaded into the collector ring 17 (Fig. 5) and a screw 24 threaded into the collector ring 18. The screws 23 and 24 respectively pass through angle brackets 31 and 32 and secure these brackets to the outer face of the plate 30, screws 25 (Fig. 2) being employed to steady the brackets in their respective positions.

A flexible metal member 33 (Fig. 2) riveted to a metallic member 34 is attached by means of a screw 35 to the outstanding flange of the bracket 31. The opposite or free end of the member 34 carries a contact point 36 positioned to engage a contact point 37 fixed to the outstanding flange of the bracket 32.

To the face of the plate 30 is clamped by means of screws 40 a slotted plate 41 and a journal 42 in which a shaft 43 is revolubly carried. A disk-wheel 44 clamped by means of screws 45 to a flange of the shaft 43, is positioned so that a portion of its periphery projects through a slotted opening 8 in the supporting plate 30. A bore extending axially through the shaft 43 is threaded to receive a screw 46, and a key pin 47 attached to the screw 46 near its end extends through the slotted opening in the plate 41. It will therefore be clear that on revolving the shaft 43 by turning the disk-wheel 44 the screw 46, while held by the pin 47 and the plate 41 against rotation, will be fed either forward or backward by the threaded bore, according to the direction in which the shaft 43 is rotated. A helical spring 48 attached between an eye in the end of the screw 46 and an eye in a rivet 49 which extends through the contact member 34 at an indented point therein, exerts pressure to retain the contact points 36 and 37 in engagement one with the other.

To the base plate 10 a lever 53 is pivoted by means of a bearing screw 54, and from the forward end of the lever a helical spring 57 extends and is anchored to the base plate 10 by means of a screw 28 thereby retaining the lever 53 alined as shown in the drawing.

The periphery of the supporting disk 30 is turned to provide a recess 50 to receive and form a rabbeted joint with the rim of a circular formed cup-like casing 58 secured by means of screws 59 which pass through the casing and engage threaded bores 60 in the mounting plate 30. A slotted opening 9 in the bottom or end plate portion of the casing 58 permits a portion of the revoluble disk wheel 44 to extend in clearance alinement therethrough in a manner similar to the position of an opposite portion of the wheel 44 through the opening 8 in the plate 30 as already described.

An angle bracket 51 secured to the base 10 by means of screws 52 serves as a holder to carry brushes 21 and 22 which are thereby retained in contact with the collector rings 17 and 18 respectively.

In tracing the circuit paths of this system, a conductor 27 (Fig. 6) extends from a source of current 26 to the motor 11, thence over the brush 21, collector ring 17, contacts 36 and 37, collector ring 18 and brush 22 to the opposite side of the source 26. In the working assembly the corresponding current paths at the governor comprise the brush 21, collector ring 17, screw 23, bracket 31, members 33 and 34, contact points 36 and 37, bracket 32, screw 24 and collector ring 18 to the brush 22. In order to protect the contacts 36 and 37 against sparking effects, a first shunt thereon is formed through a resistance unit 29 of relatively high value, while a second shunt is formed through a condenser 38 and a resistance unit 39 in series therewith, the action of which is well understood in the art.

From the foregoing description it will be clear that the governor assembly as carried by the shaft 12 revolves with the motor armature, and that centrifugal force thereby set up has a tendency to move the free end of the member 34 outwardly to separate the contacts 36 and 37. In order to adjust the member 34 to require the application of a certain amount of centrifugal force, which corresponds with a predetermined speed of the motor armature, before the contacts 36 and 37 separate, the disk-wheel 44 may be turned in either direction to suitably tension the control spring 48.

In providing that adjustments of the control spring 48 may take place while the motor armature is revolving, as in its regular driving work, two flanges 61 and 62 formed upwardly on the lever 53 stand on opposite sides of the governor casing 7, in alinement with paths through which the oppositely exposed edges of the adjusting disk-wheel 44 sweep as the governor 7 is revolved by the armature of the motor. To accomplish such adjustments the extending handle of the lever 53 may be moved toward its stop screw 55, thereby bringing the flange 61 into the path of the disk-wheel 44. The periphery of the wheel and the surface of the flange are of suitable friction material or roughed to establish "bite" therebetween in order that traction on their contacting one with the other will cause the wheel 44 to be revolved as it engages the flange in passing. It has been found that satisfactory friction clutch results may be obtained by employing leather for the disk-wheel 44 to work against plain metal surfaces on the flanges 61 and 62. Since the screw 46 is shown with a right-hand thread and assuming the motor to be running in clock-wise direction, looking at the governor equipped end of the armature, the assumed position of the lever 53 will cause the disk-wheel 44 to revolve the shaft 43 to move the screw 46 forward, thereby reducing the tension on the control spring 48. It will be obvious that conversely with such operation, movement of the lever handle 53 toward its stop screw 56 will cause the flange 62 to engage and move the disk-wheel 44 in the opposite direction, thereby backing the screw 46 and increasing the tension on the control spring 48. In this way the tension of the control spring 48 may be readily increased or decreased while the motor 11 is running and the speed range limits of the motor accordingly varied or changed.

When the spring 48 is adjusted to permit the motor to attain a certain predetermined speed, any increase in speed will develop sufficient centrifugal force on the member 34 to effect separation of the contacts 36 and 37, thereby disconnecting the source of current supply 26, until the speed of the motor is reduced sufficiently to permit the diminished centrifugal force to render the tension of the spring 48 sufficient to move the member 34 to reëstablish the contacts 36 and 37.

To illustrate a preferred arrangement as to operating proportions, it has been found desirable to employ a driving current having a potential sufficiently high to operate the motor 11, if non-governed, at a higher speed than would be required by the work the motor is intended to perform. This permits the governor to be adjusted for any desired lower speed, and the tendency of the motor to exceed such speed immediately causes the contacts 36 and 37 to operate in alternately disconnecting and connecting the current supply, thereby maintaining the speed of the motor at the predetermined point for which the governor may have been previously adjusted.

It will be obvious that the present governor may be readily applied to any form of motor drive and it may be mentioned that motors controlled in this manner are found to satisfactorily meet the requirements for driving distributers in telegraph systems or for any driving operation necessary in printing telegraphs.

What is claimed is:

1. In a speed governor, a motor, a rotatable shaft controlled thereby, a movable member adapted to travel with said shaft and to be influenced by centrifugal force, spring means for opposing the effect of centrifugal force on said movable member, adjustable means for varying the tension of said spring means, contacts controlled by said movable member, means for routing the operating circuit of said motor through said contacts, manually operated lever means having opposite limits of movement positioned stationary with respect to said shaft, flanges carried by said lever for operatively engaging said adjustable means, and spring means to normally retain said lever at a point intermediate its limits of movement.

2. In a speed governor, a rotatable shaft, a motor means for operating said shaft, a hubbed disk fixed to said shaft and axially alined therewith, a member supported by said disk, positioned on the face thereof, means to render said member responsive to centrifugal force, contacts controlled by said member, spring means and adjustable means therefor for varying the contact pressure effect of said member, means for routing the driving circuit of said motor through said contacts, manually operated lever means positioned stationary with respect to said shaft, and flanges carried by said lever means for operatively engaging said adjustable means.

3. In a speed governor, a rotatable shaft, motor means for operating said shaft, a disk fixed to said shaft in axial alinement therewith, a circuit control assembly carried on the face of said disk comprising a member responsive to centrifugal force, contacts controlled by said member, spring means for normally retaining said member to close said contacts, screw means for varying the tension of said spring means, circular means for operating said screw means, means for routing the circuit of said motor through said contacts, a cup-like cover fixed to said disk to form an inclosing casing for the face thereof, apertures respectively in said disk and said cover to permit opposite portions of the periphery of said circular means to extend therethrough, respectively, lever means positioned stationary with respect to said shaft, and flanges carried by said lever means to operatively engage the periphery of said circular means.

4. The combination with an electric motor having a rotatable shaft, a speed governor comprising a hub-like assembly provided with a first and a second collector ring fixed to said shaft, brushes for said collector rings positioned stationary with respect to said shaft, a disk fixed to said hub assembly, axially alined with said shaft and carrying an assembly comprising a first and a second bracket fixed to the face of said disk and electrically common respectively to said first and second collector rings, a contact carried by said first bracket, a contact member engaging said contact and flexibly supported by said second bracket, a spring for normally joining said contact member with said first mentioned contact, a circuit routed through said brushes and collector rings and said contacts for operating said motor, screw means for varying the tension of said spring means, a friction wheel carried by said screw means and positioned axially to form a right angle with respect to said shaft, means to permit oppositely positioned portions of the periphery of said friction wheel to extend beyond the assembly on the face of said disk and also beyond the rear surface of said disk, a manually operated lever positioned stationary with respect to said shaft and adapted to be moved either to a right-hand or a left-hand position, spring means for normally retaining said lever at a point intermediate its right-hand and left-hand positions, and oppositely positioned flanges carried by said lever and respectively adapted to operatively engage either the periphery of said friction wheel as present beyond the face of said disk or the periphery of the friction wheel which may extend beyond the rear surface of said disk.

In witness whereof, I hereunto subscribe my name this 22nd day of September, A. D. 1917.

BENJAMIN F. MERRITT.